United States Patent [19]
Kuo et al.

[11] Patent Number: 6,128,308
[45] Date of Patent: Oct. 3, 2000

[54] APPARATUS AND METHOD FOR DETERMINING A PRESENCE OF A STORED DATA FRAME IN A RANDOM ACCESS MEMORY INDEPENDENT OF READ AND WRITE CLOCK DOMAINS

[75] Inventors: Jerry Chun-Jen Kuo, San Jose; Autumn Jane Niu, Sunnyvale; Po-Shen Lai, San Jose, all of Calif.

[73] Assignee: Advanced Micro Devices, Inc., Sunnyvale, Calif.

[21] Appl. No.: 08/993,063

[22] Filed: Dec. 18, 1997

[51] Int. Cl.[7] .......................... H04L 12/54; H04L 12/413
[52] U.S. Cl. ........................... 370/428; 370/445; 710/52; 714/719; 375/354
[58] Field of Search .................................. 370/252, 253, 370/516, 517, 512, 509, 503, 445, 428, 438; 711/201, 219; 714/700, 719, 731; 709/213, 250; 710/52; 375/226, 356–7, 359, 361, 354

[56] References Cited

U.S. PATENT DOCUMENTS

| | | | |
|---|---|---|---|
| 5,426,756 | 6/1995 | Shyi et al. | 395/425 |
| 5,594,702 | 1/1997 | Wakeman et al. | 365/230.05 |
| 5,898,889 | 4/1999 | Davis et al. | 395/849 |
| 5,905,766 | 5/1999 | Nguyen | 375/354 |
| 5,951,635 | 9/1999 | Kamgar | 709/201 |
| 5,974,518 | 10/1999 | Nogradi | 711/173 |
| 5,978,868 | 11/1999 | Maas | 710/52 |

OTHER PUBLICATIONS

Stallings, Local and Metropolitan Area Networks, fifth edition, pp.: 32–33, 38, 40, 131, 186, 1997.

*Primary Examiner*—Douglas W. Olms
*Assistant Examiner*—David R Vincent

[57] ABSTRACT

A network interface device includes a random access memory used as a transmit and receive buffer for transmission and reception of data frames between a host computer bus and a packet switched network. The network interface device includes read and write controllers for each of the transmit and receive buffers, where each write controller operates in a clock domain separate from the corresponding read controller. The memory management unit also includes a synchronization circuit that controls arbitration for accessing the random access memory between the read and write controllers. The synchronization circuit determines the presence of a stored frame in the random access memory by asynchronously comparing write counter and read counter values stored in gray code counters, where each counter is configured for changing a single bit of a counter value in response to an increment signal. Use of gray code counters enables asynchronous comparisons to be made between the two counter values, independent of the host computer bus clock domain and the network clock domain.

11 Claims, 5 Drawing Sheets

APPARATUS AND METHOD FOR DETERMINING A PRESENCE OF A STORED DATA FRAME IN A RANDOM ACCESS MEMORY INDEPENDENT OF READ AND WRITE CLOCK DOMAINS

BACKGROUND OF THE INVENTION

1. Techinical Field

The present invention relates to network interfacing and more particularly, to methods and systems for buffering data between a host bus interface and a media access controller accessing Ethernet media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by the MAC, and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional problem caused by the buffering of data between the clock domain of the host computer and the clock domain of the network interface device is buffer overflow or underflow. For example, buffer overflow can occur when the time domains between the host bus and the network media are uncontrollable to the extent that data is stored in the buffer at a rate faster than the data can be removed, resulting in an overflow situation. Conversely, underflow occurs if data is removed from the FIFO buffer faster than the data can be supplied.

Hence, the non-synchronous relationship between the host bus clock domain and the network clock domain have required the necessity of FIFO buffers to compensate for timing discrepancies between the host computer and the network.

DISCLOSURE OF THE INVENTION

There is a need for an arrangement that enables use of a random access memory in a network controller, as opposed to a FIFO buffer, to compensate for timing discrepancies between the host computer and the network.

There is also a need for an arrangement enabling the use of a random access memory as a buffer in a network interface device, where potential synchronization problems between the clock domain of the host computer and the clock domain of the network are resolved to enable efficient control of the random access memory during the writing and reading of transmit or receive data.

These and other needs are attained by the present invention, where a synchronization circuit is configured for determining a presence of a stored frame in a random access memory in response to first and second signals from respective write and read controllers operating according to respective clock domains, such that the synchronization circuit determines the presence of the stored frame independent of the first and second clocks.

According to one aspect of the present invention, a method for monitoring a storage of a data frame in a buffer memory comprises storing the frame in a random access memory at a prescribed memory location using a write controller operating according to a first clock, supplying a first signal to a first counter based on the storing step, the first counter configured for changing a single bit of a first counter value in response to each received first signal, reading the first frame from the random access memory using a read controller operating according to a second clock independent from the first clock, supplying a second signal to a second counter based on the reading step, the second counter configured for changing a single bit of a second counter value in response to each received second signal, and comparing the first and second counter values to determine a presence of a stored data frame in the random access memory. The "stored data frame" refers to storage of a complete data frame in the random access memory. Use of the first and second counters configured for changing a single bit of the corresponding value in response to a received signal ensures that asynchronous comparisons provide reliable results, without the concerns of false values generated during multiple bit transitions that may normally occur using conventional binary counter values. Moreover, the ability of performing reliable comparisons in an asynchronous system enables the detection of a stored data frame in the random access memory, independent of the clock domains controlling the first and second clocks, respectively. The determination of whether a data frame is stored in the random access memory may also be used to control synchronization for writing and reading operations to the random access memory, for example by assigning a priority for writing operations upon determining that a complete data frame is not stored in the random access memory.

Another aspect of the invention provides a network interface device for storing a data frame, comprising a random access memory, a write controller configured for writing the frame into the random access memory at a prescribed location according to a first clock, the write controller outputting a first signal based on the writing of the frame, a read controller configured for reading the frame from the random access memory according to a second clock independent from the first clock, the read controller outputting a second signal based on the reading of the frame, and a synchronization circuit for determining a presence of a stored frame in the random access memory in response to each of the first and second signals and independent of the first and second clocks. Use of a synchronization circuit enables a random access memory to be used instead of a FIFO-based buffer memory, while maintaining reliable buffering of data during writing and reading operations. Hence, the network interface device attains the advantageous features of using a random access memory over a FIFO-based buffer memory, for example faster access and smaller memory area, without the introduction of synchronization problems associated with a random access memory management scheme.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface device in a packet switched network, such as an Ethernet (IEEE 802.3) network. A description will first be given of a network interface architecture, followed by the arrangement for monitoring the storage of a data frame in a buffer memory, independent of host computer clock and network data clock domains. It will become apparent, however, that the present invention is also applicable to other network interface device systems.

NETWORK INTERFACE ARCHITECTURE

Figure 1:
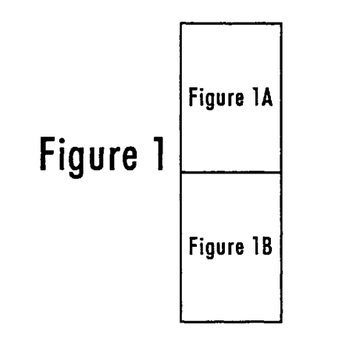
FIGS. 1, 1A and 1B is a block diagram illustrating an exemplary network interface device including a synchronization circuit for controlling buffer memory controllers according to an embodiment of the present invention.
Figure 1A:
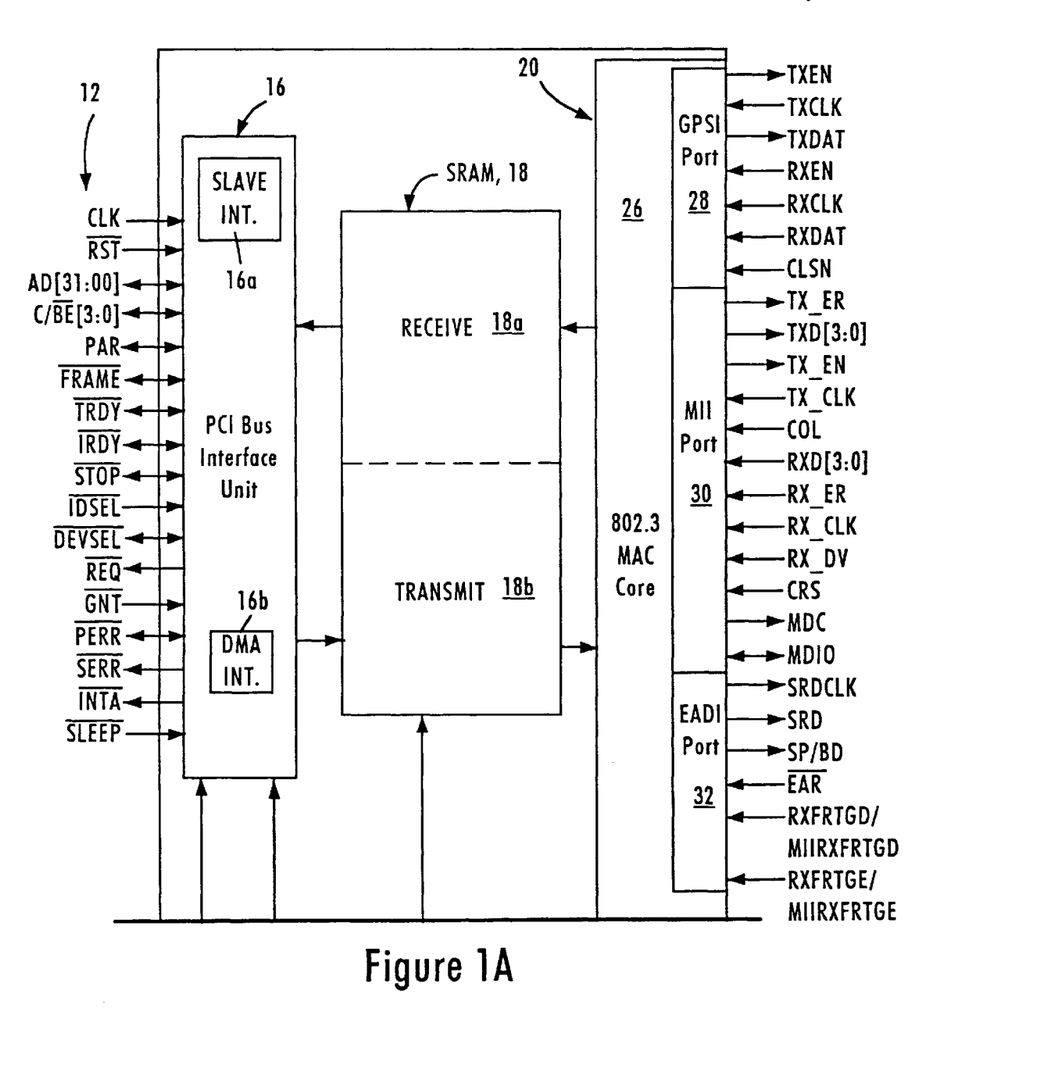
Figure 1B:
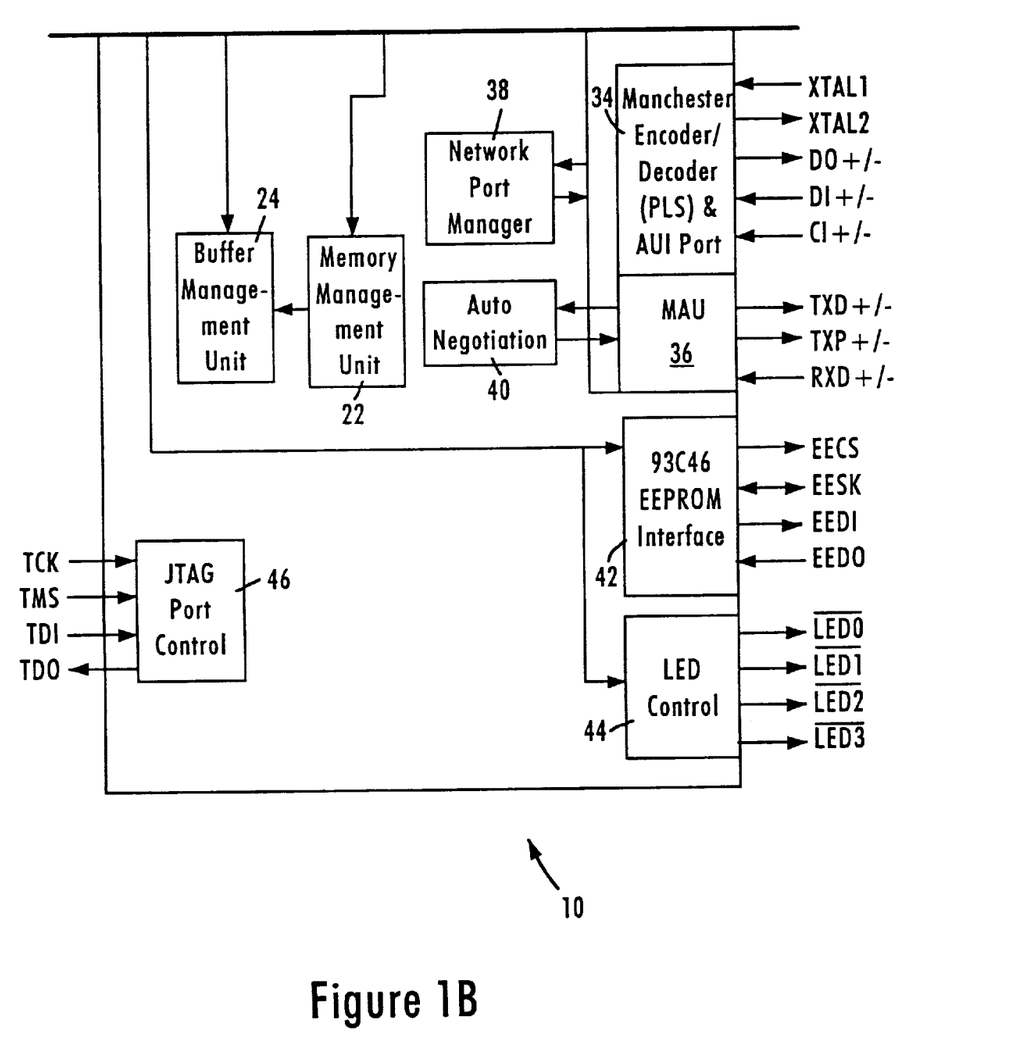

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

MEMORY MANAGEMENT ARCHITECTURE

Figure 2:
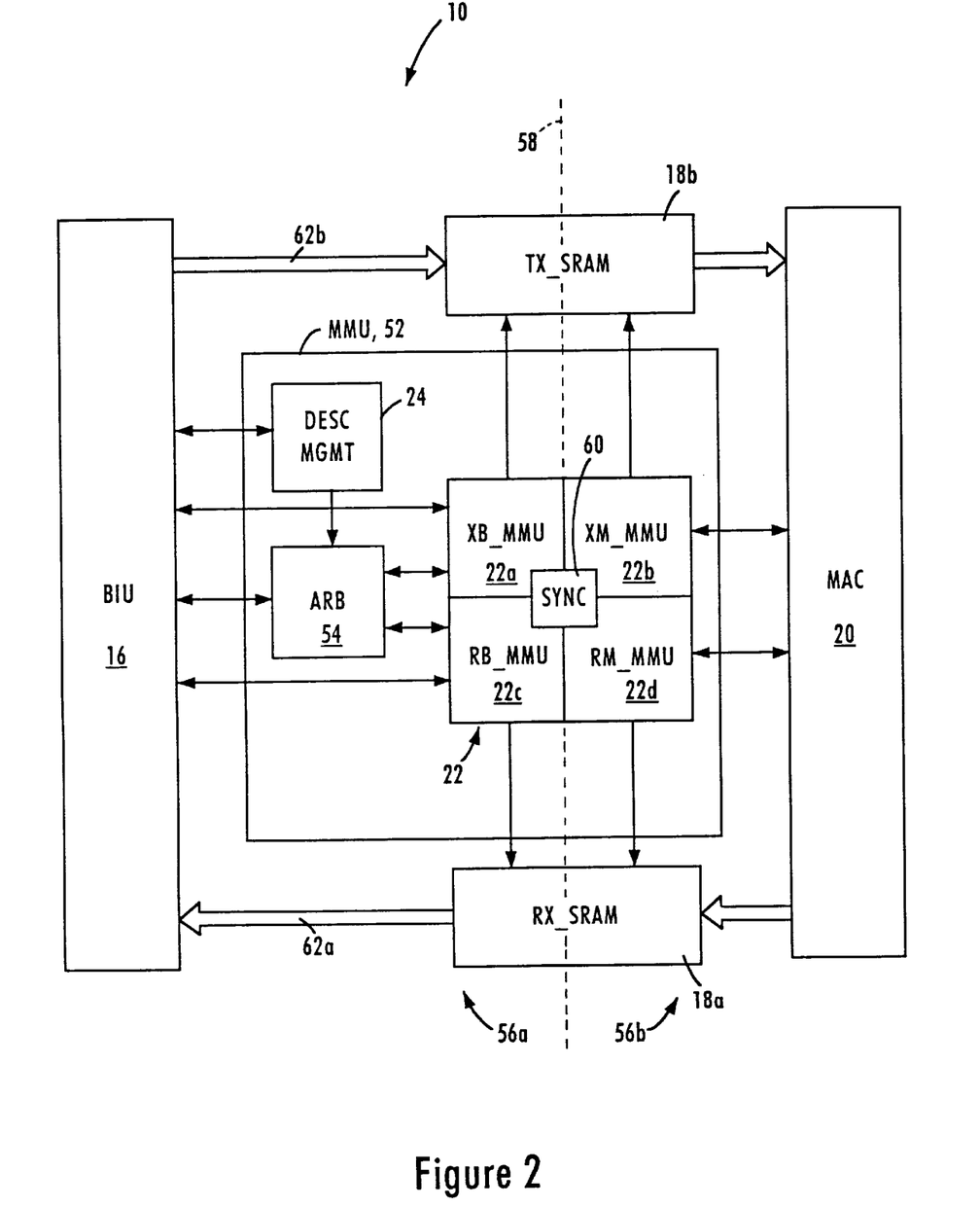
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a. respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3:
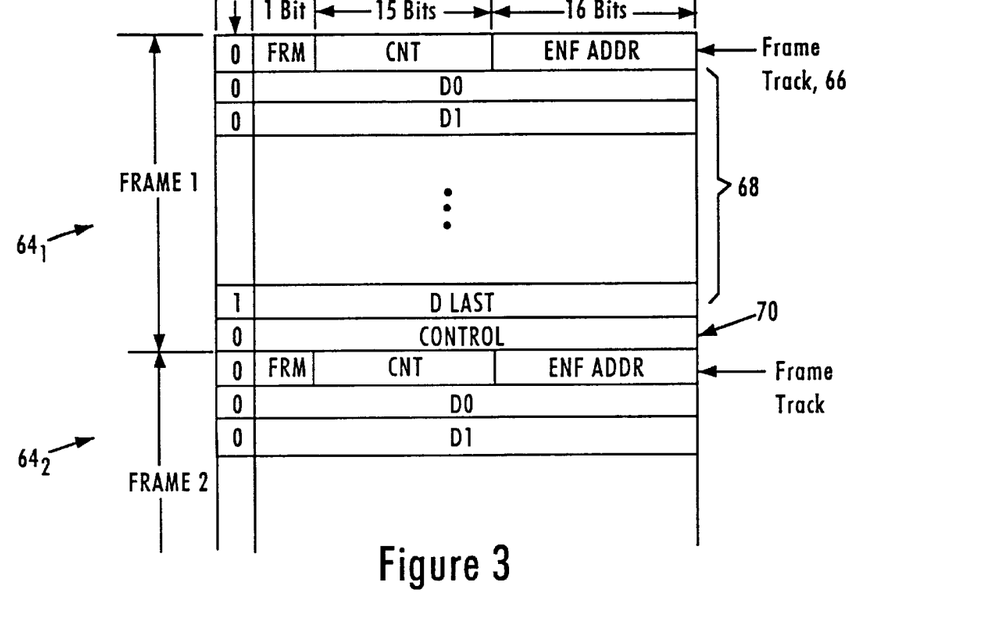
FIG. 3 is a diagram illustrating an exemplary data structure of a data frame stored in the random access memory of FIGS. 1 and 2.

FIG. 3 is a diagram illustrating a data structure of a transmit data unit in the TX_SRAM 18b. A similar structure also may be used for storing data in the RX_SRAM 18a. As shown in FIG. 3, each stored data frame 64 includes a frame track field 66 preceding a group of data bytes representing the frame data 68 (i.e., the packet data to be transmitted by the MAC 20), followed by a control field 70. In this case, the XB_MMU 22a stores frame track information 66 and the control field 70 related to the transmit data frame 68. The frame track field 66 is used by the XM_MMU 22b to keep track of the location of the corresponding transmit data frame 68 in the TX_SRAM 18b. Hence, the frame track 66 enables the XM_MMU 22b to quickly flush a stored data frame 64 having transmit data frame 68 and jump to the beginning of the next stored data frame (e.g., $64_2$), based on an end of frame address field (ENF ADDR), a count (CNT) field specifying the number of DWORDS (D0, D1, . . . , DLAST), and an end of frame (ENF) bit indicating whether the data frame 64 contains valid data ready for reading.

Assume that the XB_MMU 22a is writing a sequence of data frames 64 (frame 1, frame 2, etc.) into TX_SRAM 18b, while the read controller 22b is reading out the data frames from the TX_SRAM 18b to the MAC 20. If the read controller discards (e.g., flushes) a transmit data frame and desires to jump to the beginning of the next data frame, the synchronization circuit 60 must be able to track the start and beginning of each data frame to ensure that the read controller 22b (or the read controller 22c for receive data) properly locates the beginning of the next data frame.

The synchronization circuit 60 includes read and write frame counters for each SRAM 18a and 18b in order to enable the corresponding memory management unit to track the number of stored data frames. The memory management unit tracks the number of stored data frames based on the difference between the write frame counter value and the read frame counter value. Since the writing and reading operations occur in two independent clock domains 56, however, a condition may arise where the read and write frame counters are about to store the same count values.

For example, assume a read frame counter value and a write frame counter value are stored in binary counters, where a write frame counter has a value (WR=100) and a read frame counter in the second independent clock domain transitions from (RD =011) to (RD =100). Since the clock domain 56a and 56b operate independently of each other, a logic comparator performing a comparison between the write frame counter and read frame counter may erroneously conclude that the read and write frame counters have different values at a point in time where the read frame counter has a transitional value (e.g., 101, 111, or 000) as the read frame counter is being updated. Hence, the attempt to perform an asynchronous comparison between the binary read and write frame counters may cause an erroneous conclusion that the read and write pointers are not equal, causing the read controller to read invalid data from memory location 64 while the write controller is writing the data without the opportunity of having updated the frame track information 66.

One possible solution for preventing asynchronous comparisons during counter transitions is to provide latched outputs for the counter values. However, such an arrangement would severely degrade the timing performance of the random access memory as a buffer device.

SYNCHRONIZATION CIRCUIT OPERATION

According to the disclosed embodiment, the synchronization circuit 60 includes a read counter and a write counter for each transmit SRAM 18b and receive SRAM 18a, where each counter is configured for counting a number of written (or read) frames by changing a single bit of a counter value in response to a corresponding signal from the associated MMU controller.

Figure 4:
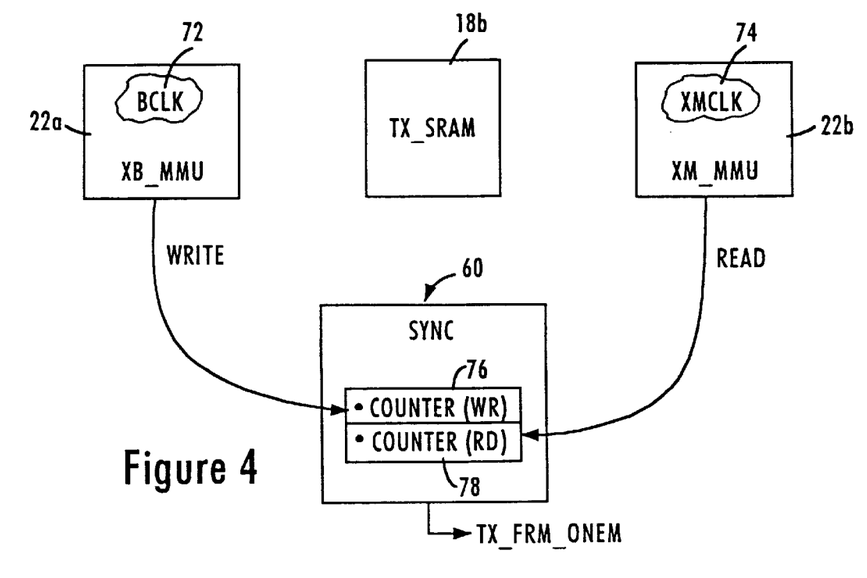
FIG. 4 is a block diagram illustrating in detail the architecture of the memory management unit of FIG. 2.

FIG. 4 is a block diagram illustrating operation of the synchronization circuit 60 with the read and write controllers for the transmit SRAM 18b according to an embodiment of the present invention. As shown in FIG. 4, the write controller (XB_MMU) 22a for the transmit SRAM 18b is configured for writing a frame (e.g., the data frame 64) into the transmit SRAM 18b according to a bus clock (BCLK) 72 synchronized relative to the host bus clock domain 56a. The write controller 22a, upon writing an entire data frame 64 into the transmit SRAM 18b, outputs a write signal to the synchronization circuit 60 indicating the completed writing of the data frame 64 into the TX_SRAM 18b. Specifically, the write controller 22a writes the data frame 64 in FIG. 3 by receiving the frame data 68 from the host computer bus 12 according to the host computer bus clock 72. The write controller 22a then reserves a portion of the prescribed memory location 64 of the transmit SRAM 18b by first writing null data for the frame track 66 to hold header information. The actual frame data is then written in portion 68, followed by control information 70. Following the writing of the data portion 68, the write controller 22a then returns to the frame track field 66 and updates the frame track with the appropriate header information, including setting the end of frame address (ENF ADDR), updating the count (CNT) field indicating the number of DWORDS in the frame, the frame bit (FRM), and the ENF bit indicating that the memory location 64 stores valid data.

Hence, the write controller 22a outputs the write signal to the synchronization circuit 60 after updating the frame track field 66, at which point the transmit SRAM 18b stores a valid data frame 64 at a prescribed location. Assuming, however, that the read controller attempted to read the memory location 64 prior to completion by the write controller 22a, the read controller 22b would obtain invalid data, since the frame track field 66 would not yet be updated with valid data.

According to the disclosed embodiment, the synchronization circuit 60 determines a presence of a complete stored data frame 64 in the random access memory 18b in response to read and write signals and independent of the bus clock 72 and the transmit MAC clock (XMCLK) 74. Specifically, the synchronization circuit 60 includes a write frame counter 76 configured for changing a single bit of a write counter value in response to the write signal output from the write controller 22a. The synchronization circuit 60 also includes a read counter 78 configured for changing a single bit of a read frame counter value in response to the read signal from the read controller 22b. As described above, the read controller 22b is configured for reading the frame 64 from the transmit SRAM 18b according to a transmit MAC clock (XMCLK) 74, where the read controller 22b outputs a read signal to the synchronization circuit 60 in response to the reading of the frame.

According to the disclosed embodiment, the write frame counter 76 and the read frame counter 78 are implemented as gray code counters, such that only a single bit of a counter value is changed in response to assertion of the status signal from the corresponding memory controller 22. Use of the gray code counter ensures that any asynchronous comparison between the write frame counter 76 and the read frame counter 78 does not result in any erroneous values due to multiple bit transitions that may otherwise occur in counters using binary-format representations.

Figure 5:
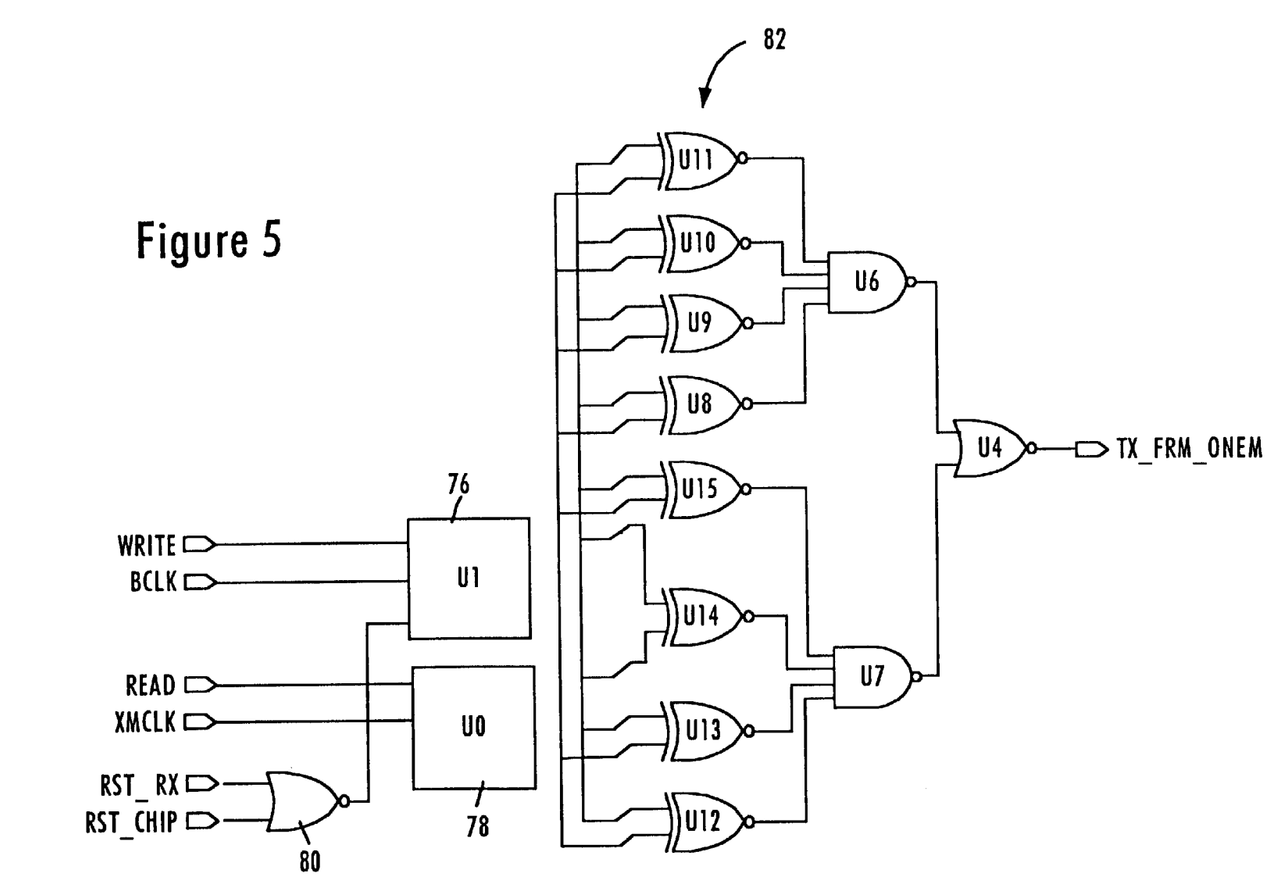
FIG. 5 is a block diagram illustrating the synchronization circuit of FIG. 4 that generates a one-or-more stored frame signal according to an embodiment of the present invention.

FIG. 5 is a diagram illustrating in further detail the synchronization circuit 60, where the write frame counter 76 receives the write signal from the memory controller 22a and the bus clock signal (BCLK) 72. Hence, the write frame counter 76 is synchronized with the bus clock 72. The read frame counter 78, however, receives the read signal from the read controller 22b and the transmit MAC clock 74 to ensure synchronization with the read controller 22b. The counters 76 and 78 are initialized by a reset circuit 80 such that the read counter will have a value equal to the write counter 78.

The gray code counters 76 and 78 output their respective counter values to an asynchronous comparator 82, composed of a plurality of exclusive OR gates. The comparator generates a comparison result indicating the presence of a stored frame based on the first and second frame counter values, such that the comparator 82 outputs a one or more signal (TX_FRM_ONEM) indicating the presence of at least one stored frame in the transmit SRAM 18b if the stored counter values from the write frame counter 76 and the read frame counter 78 are unequal. If the write frame counter 76 and the read frame counter 78 have the same counter value, then the write controller 22a and the read controller 22b are pointing to the same data frame. If the write controller 22a has not yet completed writing of data to the memory location, reading by the memory controller 22b at that same memory location being written to would result in the reading of erroneous data.

Hence, the comparator 82 outputs a transmit frame one or more signal (TX_FRM_ONEM) if the read and write frame counter values are unequal, indicating storage of at least one valid (i.e. completely written) data frame in the SRAM 18b. The comparison result (TX_FRM_ONEM) can then be used by additional synchronization logic within the synchronization circuit 60 to further control the memory controllers 22. For example, one use of the TX_FRM ONEM signal is to determine whether priority access to the SRAM 18b should be granted to the write controller 22a or the read controller 22b. If the one or more signal equals zero, then the SRAM stores less than a full frame, indicating priority should be granted to the write controller to write a valid data frame. If the one or more signal equals one, then priority access may be granted to the read controller, since one or more frames of valid data are stored in the SRAM 18b.

According to the disclosed embodiment, a synchronization circuit controls arbitration for accessing a random access memory between read and write controllers by determining the presence of a stored data frame (i.e., a complete data frame and any corresponding frame track or status information) by asynchronously comparing write frame counter and read frame counter values. The write frame counter and read frame counter are implemented as gray code counters, where each counter is configured for changing a single bit of a counter value in response to an increment signal, for example a write signal or a read signal. Hence, asynchronous comparisons can be made between the two counter values without concern of transitional counter states that normally may occur when using binary-format counters.

Although not specifically disclosed, the synchronization circuit 60 includes another set of write and read frame counters 76' and 78' that supply the respective counter values to a comparator 82' to determine the presence of a stored received data frame in the RX_SRAM 18a.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for monitoring a storage of a data frame in a buffer memory, comrising:
   storing the frame in a random access memory at a prescribed location using a write controller operating according to a first clock;
   supplying a first signal to a first counter based on the storing step, the first counter configured for changing a single bit of a first counter value in response to each received first signal;
   reading the first frame from the random access memory using a read controller operating according to a second clock independent from the first clock;
   supplying a second signal to a second counter based on the reading step, the second counter configured for changing a single bit of a second counter value in response to each received second signal; and
   comparing the first and second counter values to determine a presence of a stored data frame in the random access memory, wherein
   the comparing step includes generating a comparison result indicating one of a presence of less than one complete frame in the random access memory and the presence of at least one frame as said stored data frame in the random access memory, and
   the storing step comprises:
      receiving the frame from a host computer bus according to a host computer clock as the first clock;
      reserving a first portion of the prescribed memory location for header information corresponding to the frame;
      writing the frame at a second portion of the prescribed memory location; and
      following the writing step, updating the first portion with the header information.

2. The method of claim 1, wherein the first signal supplying step includes supplying the first signal to the first counter in response to the updating step and according to the first clock.

3. The method of claim 2, wherein the reading step comprises reading the frame from the prescribed memory location to a media access controller (MAC) according to a MAC transmit clock.

4. The method of claim 3, wherein the second supplying step includes supplying the second signal to the second counter in response to the reading step.

5. The method of claim 1, wherein the first and second counters are gray code counters.

6. A method for monitoring a storage of a data frame in a buffer memory, comprising:
   storing the frame in a random access memory at a prescribed location using a write controller operating according to a first clock;
   supplying a first signal to a first counter based on the storing step, the first counter configured for changing a single bit of a first counter value in response to each received first signal;
   reading the first frame from the random access memory using a read controller operating according to a second clock independent from the first clock;
   supplying a second signal to a second counter based on the reading step, the second counter configured for changing a single bit of a second counter value in response to each received second signal; and
   comparing the first and second counter values to determine a presence of a stored data frame in the random access memory, wherein
   the comparing step includes generating a comparison result indicating one of a presence of less than one complete frame in the random access memory and the presence of at least one frame as said stored data frame in the random access memory, and
   the storing step comprises:
      receiving the frame from a media access controller (MAC) according to a MAC receive clock as the first clock;
      reserving a first portion of the prescribed memory location for header information corresponding to the frame;
      writing the frame at a second portion of the prescribed memory location; and
      following the writing step, updating the first portion with the header information.

7. The method of claim 6, wherein the first signal supplying step includes supplying the first signal to the first counter in response to the updating step and according to the first clock.

8. The method of claim 7, wherein the reading step comprises reading the frame from the prescribed memory location to a host computer bus interface according to a host computer bus clock as said second clock.

9. The method of claim 8, wherein the second supplying step includes supplying the second signal to the second counter in response to the reading step.

10. The method of claim 1, wherein
   generating a comparison signal indicating a presence of at least one frame as said stored data frame in the random access memory is based on the first and second counter values being unequal.

11. The method of claim 10, wherein the determining step comprises supplying the first and second counter values to a series of exclusive-OR gates.

* * * * *